United States Patent
Gnosspelius et al.

(10) Patent No.: US 6,714,646 B1
(45) Date of Patent: Mar. 30, 2004

(54) METHOD AND APPARATUS FOR ECHO SUPPRESSION

(75) Inventors: Johan Gnosspelius, Stockholm (SE); Patrik Sörqvist, Spånga (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/515,628

(22) Filed: Feb. 29, 2000

(30) Foreign Application Priority Data

Sep. 1, 1997 (SE) .............................................. 9703143

(51) Int. Cl.$^7$ .............................................. H04M 9/08
(52) U.S. Cl. .................. 379/406.01; 370/286; 370/289; 370/352
(58) Field of Search ...................... 379/406.01, 406.04, 379/406.06, 406.07; 370/286, 289, 352, 353, 354, 355, 356

(56) References Cited

U.S. PATENT DOCUMENTS

| 5,014,306 A | * | 5/1991 | Rodgers et al. ........ 379/406.04 |
| 5,075,687 A | | 12/1991 | Chen et al. .................. 341/110 |
| 5,222,251 A | | 6/1993 | Roney, IV et al. ........... 455/570 |
| 6,192,399 B1 | * | 2/2001 | Goodman ..................... 725/78 |
| 6,236,365 B1 | * | 5/2001 | LeBlanc et al. ............ 342/457 |
| 6,504,838 B1 | * | 1/2003 | Kwan .......................... 370/352 |
| 6,549,587 B1 | * | 4/2003 | Li ............................... 375/326 |
| 6,597,732 B1 | * | 7/2003 | Dowling ..................... 375/222 |

FOREIGN PATENT DOCUMENTS

| WO | 96/22651 | 7/1996 |
| WO | 96/42142 | 12/1996 |

* cited by examiner

*Primary Examiner*—Binh Tieu

(57) ABSTRACT

The present invention relates to echo suppression in a telephony system wherein a communication link is established over an analogue network and a digital network. The disclosed echo suppression invention provides cost-effective ways of minimizing an echo arising in the public switched telephone network (PSTN) by calculating a first value for the energy level of the signal from the analogue to the digital network, and likewise calculating a second value for the energy level of the signal from the digital to the analogue network. The sound from the analogue network to digital network is transmitted in dependence of the results of a comparison between the first and second values.

12 Claims, 3 Drawing Sheets

METHOD AND APPARATUS FOR ECHO SUPPRESSION

This application claims priority under 35 U.S.C. §§119 and/or 365 to 9703143-9 filed in Sweden on Sep. 1, 1997; the entire content of which is hereby incorporated by reference.

This application is a continuation application of International Application No. PCT/SE98/01546, filed Aug. 31, 1998, which designates the United States.

TECHNICAL FIELD

The present invention relates to a method, a system and an apparatus for echo suppression in telephony, in which part of the conversation is transmitted over the Internet.

STATE OF THE ART

Data communication over the Internet is a technology that has been steadily growing, with respect to the number of users, over the last years. A normal residential user blocks the ordinary telephone line when connected to the Internet since normally a modem is used to connect to the Internet through a service provider. This may cause problems, for example, when waiting for a telephone call.

This has been solved in prior art by introducing a port between the Internet and the Public Switched Telephone Network (PSTN). By introducing such a port a user can, while connected to the Internet through a modem on his ordinary telephone line, answer incoming calls and initiate outgoing calls. The technology functions by forwarding any incoming calls to said port. The port contacts a client software at the user's site through the Internet. The client informs the user that there is an incoming call waiting. The user can choose one of a number of options, among others to receive the call. If the user chooses to receive the call, the port functions as a converter between the speech format in the telephone network and the Internet. The method is described in detail in the Swedish patent application SE-96039326.

Swedish patent application SE 9700873 discloses how crosstalk between the microphone and the loudspeaker on the Internet side can be minimized.

Echo is caused in the conventional telephone network, for example, if the impedance is not well enough adapted between the 4-wire and the 2-wire transfer. This problem is solved in the conventional telephone network by means of relatively expensive equipment and methods with high requirements on processing capacity. The methods involve, for example, filtering the sound, which requires relatively high processing capacity. To minimize the cost for the customer, of course, it is interesting to find alternative inexpensive and effective solutions. This is true in particular for the exploding Internet market in which it is important for the Internet Service Providers (ISP) to present new functions fast and where, for example, the speech quality is not as crucial.

On the Internet side no echo arises since all transmission is digital. If the user is using a headset with earphones and a microphone close to the mouth no, or very little, crosstalk is caused. Thus, no echo arises on the Internet side.

SUMMARY OF THE INVENTION

The present invention attacks the problem of how, in a cost efficient way, and utilising a minimum of processing capacity, the echo arising in the PSTN network in a call connected at least in part through a digitally based network can be minimized, while still maintaining a high quality.

Thus a purpose of the present invention is to minimize, in a cost efficient way, the echo, while minimizing the need for processing capacity.

The above problem of minimizing an echo arising in an analogue part of a connection is solved in that a switch can stop the sound from passing from the analogue to the digital part of the network.

More specifically the above problem is solved by calculating, for each Pulse Code Modulation (PCM) frame from the digital to the analogue side the energy in the frame a background energy level, an average energy level over a relatively long period and a value for the energy compared to the background energy. These paramneters are fed to a control switching function. Corresponding values are also calculated for PCM frames from the analogue to the digital side. These frames are also used by the control switching function. In dependence of the above mentioned values the control switching function decides if PCM frames from the analogue side are to be forwarded with the received data or instead be filled with zeros or background noise. PCM frames from the digital to the analogue side are not modified.

An advantage of the present invention is that the processor capacity required for the echo suppression is a fraction of that needed for a conventional echo suppression. Measurements show that in a Digital Signal Processing (DSP) board of the brand Antares from the company DLILOGIC in the USA echo suppression requires approximately 2% of the processing capacity while echo suppression according to conventional methods requires approximately 50% of the processing capacity. This means that a speech encoder, a speech decoder and echo suppression for one channel can be implemented on the same DSP board, which is not possible with conventional techniques.

Another advantage of the present invention is that it is inexpensive to implement.

Yet another advantage of said invention is that the echo suppression according to said method results in a better quality than performing echo suppression at the site of the user on the digital side. The Swedish paten SE9700873-4 describes a method for performing echo suppression at the site of the user at the digital site. If there is a risk of significant crosstalk between the microphone and the loudspeaker for the user on the digital side it may, however, be necessary to use the invention according to SE9700873-4. SE9700873-4 and the above mentioned invention complement each other in the sense that one or the other method may be used in dependence of the equipment used by the user on the digital side.

Another advantage is that the subscriber on the analogue side can participate in the conversation by talking louder than the user on the digital side.

The invention will now be described in more detail by means of preferred embodiments and with reference to the appended drawings.

DESCRIPTION OF PREFERRED EMBODIMENT

Figure 1:
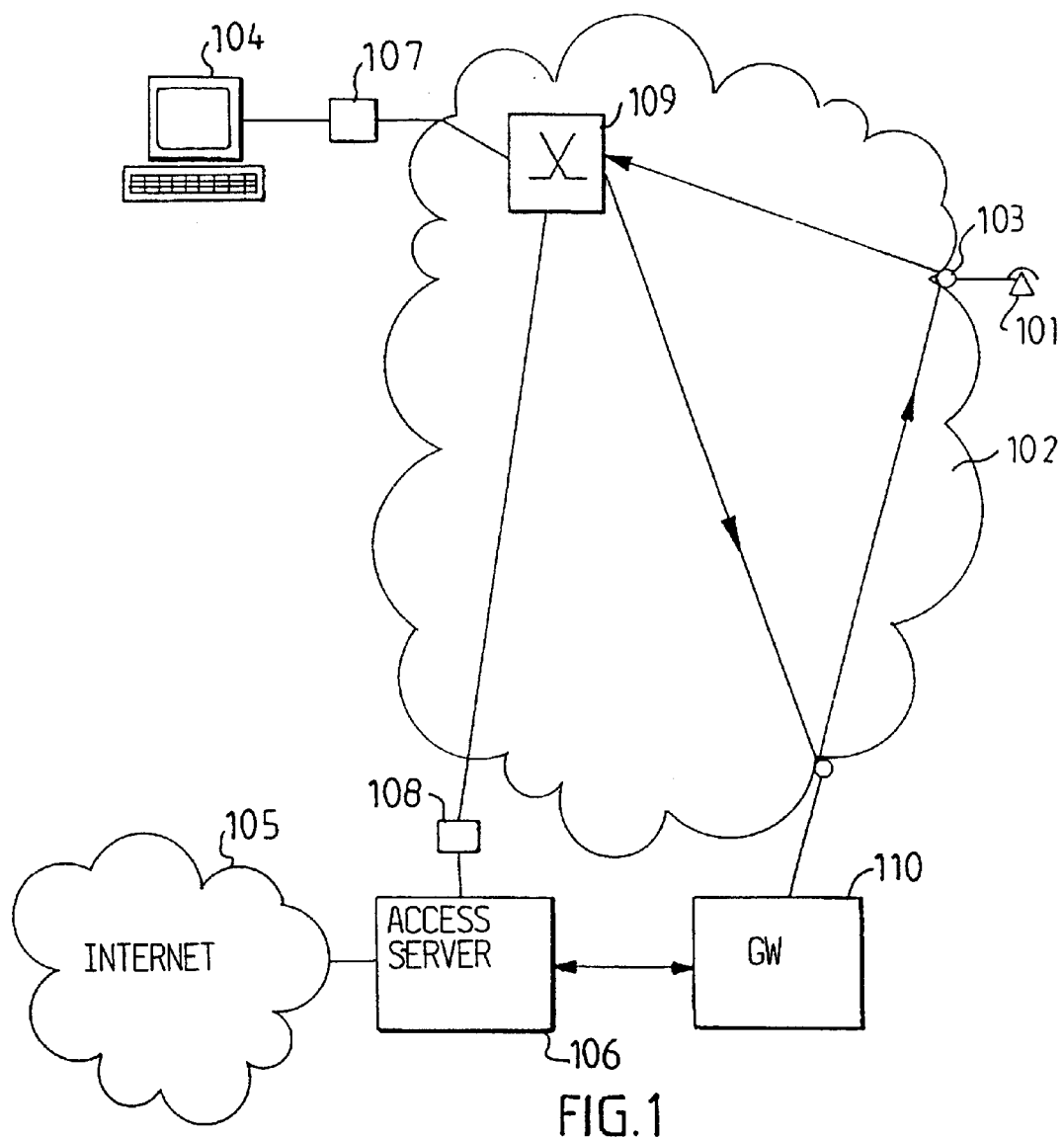
FIG. 1 shows a schematic network according to the invention.

FIG. 1 shows, schematically, a telephone call between a subscriber 101 connected to an analogue network, PSTN 102 in a connection point 103. FIG. 1 also shows a user 104 connected to the Internet 105 through an access server 106. The communication between the user 104 and the access server 106 goes through the PSTN network 102 involving two modems 107 and 108. The user 104 is connected to a local telephone exchange 109. When the subscriber 101 calls the user 104, the call is forwarded to a gateway 110. The gateway 110 contacts the access server 106 which informs the user 104 that a call is waiting. If the user 104 accepts the call a connection is set up from the gateway 110 to the subscriber 104. An echo then arises in the connection point 103. The gateway 111 has equipment for speech encoding and decoding, and is also the site of the echo suppression. The transmission of the speech in the PSTN network 102 is not important to the invention. FIG. 1 shows, in a schematic way, that a forwarding of the connection is made in the exchange 109, but this does not necessarily mean that the speech connection follows this path.

Speech encoding and decoding are performed in the gateway 110 by a number of DSP boards installed in a personal computer. Each DSP board can handle one channel that is, one speech encoding, one speech decoding and echo suppression in connection with encoding and decoding, respectively. With the current development of processors a DSP board will probably soon be able to handle more than one channel especially considering the increasing effectiveness of echo suppression brought about by the present invention.

Figure 2:
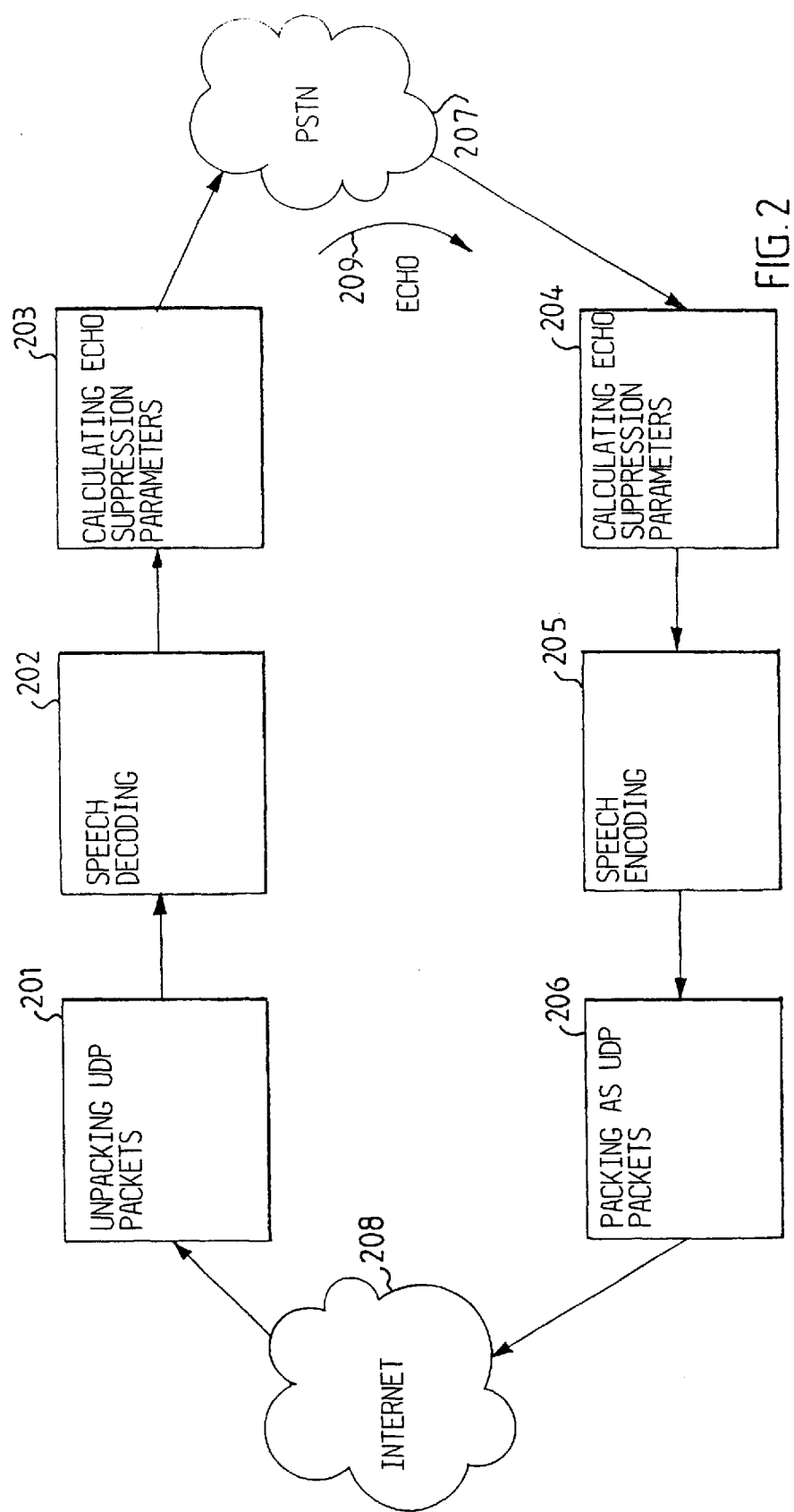
FIG. 2 is a block diagram according to the invention.

FIG. 2 shows, schematically, in the form of a block diagram, some of the functions performed in the gateway 110, which are important to the present invention. The reference numeral 207 denotes an analogue PSTN network, and the reference numeral 208 denotes a digital network, for example, the Internet The reference numeral 209 denotes an echo arising in the analogue network 207. To the block 201 User. Datagram Protocol (UDP) packets arrive from the Interm 208 and are unpacked. The unpacked encoded speech is sent to a decoding block 202, in which a decoding is carried out In the encoding functions according to the GSM standard 0610 are used. From the decoding block 202 PCM frames are sent to a first computing block 203. The first computing block 203 performs some calculations on the PCM frame. These calculations are described in greater detail in connection with FIG. 3. The result from the first computing block is used by a second computing block 204. The second computing block 204 receives PCM frames from the analogue PSTN network 207 and performs the same calculations as the first computing block 203. Further, the second computing block 204 decides whether the PCM frame from the analogue PSTN network 207 is to be transmitted to the Internet 208 as it is or be filled with zeros or background noise.

Thus, the second computing block 204 functions as a switch that can prevent speech in the connection between the subscriber 101 and the user 104 in FIG. 1, in the direction from the PSTN network 207 to the Internet 208. From the second computing block 204 the PCM frame is forwarded to a speech encoding block 205 in which speech encoding is performed according to the GSM standard 0610. The encoded speech is then packed to UDP packets in the block 206 and is transmitted to the user 104 in FIG. 1 through the Internet 208, or through the access server 106 directly to the user 104.

Figure 3:
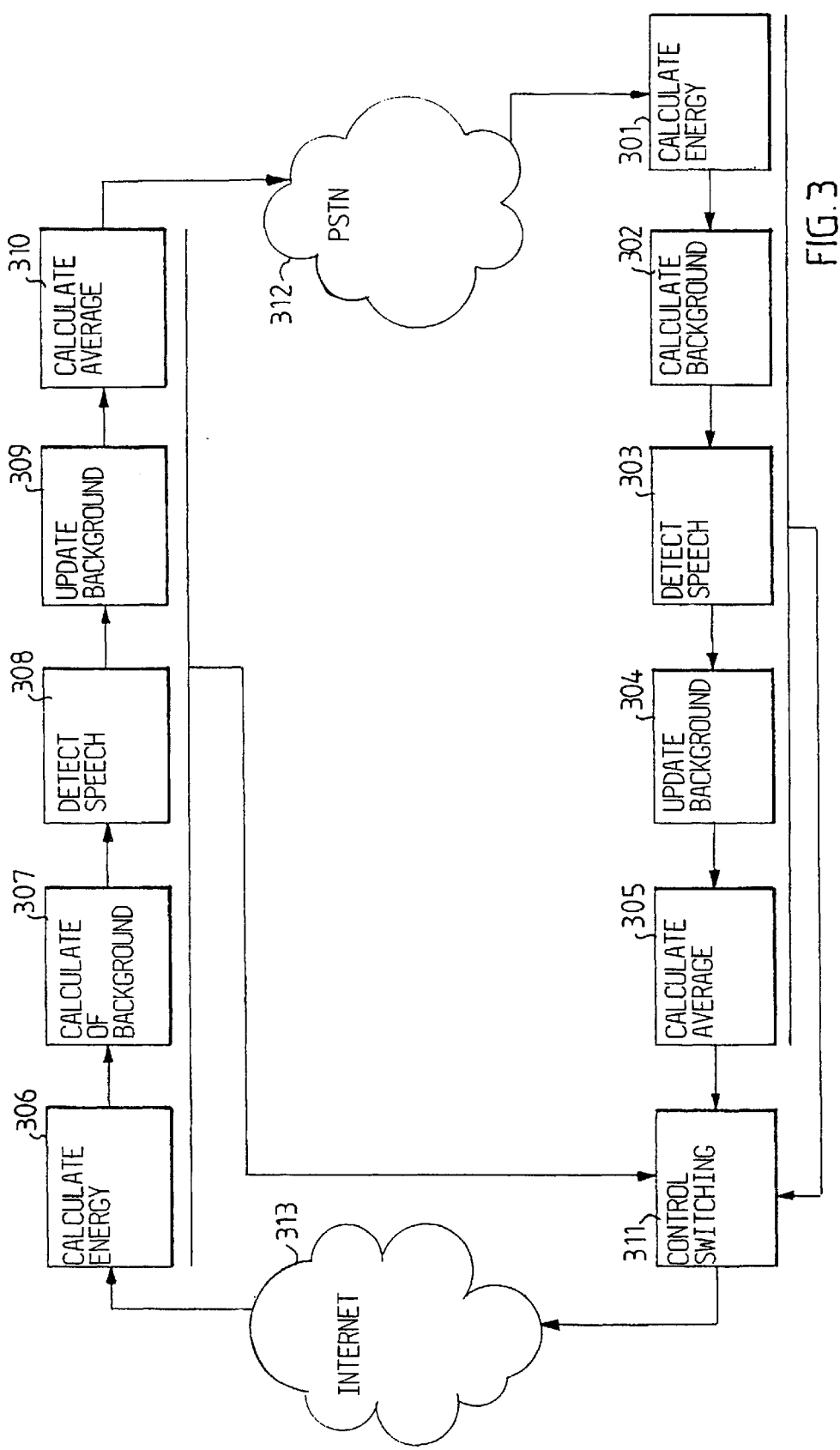
FIG. 3 is a detailed block diagram according to the invention.

FIG. 3 shows in greater detail the first and the second calculating blocks 203, 204 shown in FIG. 2. The function blocks in FIG. 3 will be exemplified by program code in the programming language C. The program code is not intended to in any way restrict the scope of the inventive function but merely constitutes one of a number of different ways to implement the function. The following constants are used in the C code below.

| | |
|---|---|
| #define pstnoffsetramp | 128 |
| #define offsetrampshft | 6 |
| #define pstnnoiscountreduct | 2 |
| #define clientoffsetramp | 256 |
| #define offset | 10 |
| #define maxnoisecounter | 100 |
| #define maxnoisecount_plus1 | 101 |
| #define maxhangover | 3 |
| #define maxtimeout | 5 |
| #define AUDIOBUFFERLEN | 160 | define Max (A,B) ((A) >= (B) ? (A) : (B))
define Min (A,B)..((A) >= (B) ? (B) : (A))

A PCM frame consists of 160 samples, 8 kHz and thus contains 20 ms of speech.

To a first block 301 in FIG. 3 a PCM frame arrives from the analogue network PSTN 312 on its way to the digital network, the Internet 313. In the first block 301 the energy in the PCM frame 301 is calculated. The computation of the frame energy may be carried out, for example, as shown in the C code below:

```
/* Calculate frame energy */
for(loop = 0 ; loop < AUDIOBUFFERLEN ; loop++)
    {
        pstnframeenergy += abs (pstn_buf[loop])>>8) ;
    }
/* End */
```

In the code above AUDIOBUFFERLEN is a constant equal to the number of samples in the PCM frame. In pstrameenergy a value for the frame energy in the PCM frame transmitted from the analogue to the digital side is stored.

In a second block 302 the level of the background energy is calculated. An example of this is given in the following C code:

pstnbackground=(32442.0/32768.0)*pstnbackground+(325.0/32768.0)*pstnbackgroundsample pstnbackgroundsample is the last sample containing the value of the background level. It is updated in a fourth block 304. The background energy level only changes slowly, as can be seen from the code above.

In a third block 303 speech is detected. This is done by calculating a ratio between the background energy level and the energy level of the PCM frame.

pstnvsbackground=-(((long)pstnbackground*
    pstnoffsetramp)>>offsetrampshft)+pffset (long)pstnframeenergy pstnvsbackground is calculated to be positive if the energy of the PCM frame is greater than the background energy. If pstnbackground is positive the PCM frame is presumed to comprise speech. Thus, pstnbackground may be used as a means for determining if the subscriber 101 is speaking or silent.

In the fourth block 304 the parameters calculated above are used to update pstnbackgroundsample.

```
/* update pstnbackgroundsample */
if (pstnvsbackground <= 0) /* If not speech, then . . . */
{ /* update pstnbackgroundsample since it was not speech */
  /* Decrement noise counter. Noise counter is used as protection against
  detecting background as speech. If 100 speech frames are detected an
  update of pstnbackgroundsample is forced
        */ noisecounterpstn = Max ((noisecounterpstn -
             pstnnoisecounterreduct), 0);
  /* update */
  pstnbackgroundsample = pstnframeenergy;
}
else
{ /* Appears to be speech but may also be increased background level
  */
  noisecounterpstn -= maxnoisecounter;
  if (noisecounterpstn < 0)
    noisecounterpstn += maxnoisecount_plus1
  if (noisecounterpstn == 0)
    psmbackgroundsample = pstnframeenergy;
}
```

The code in the else sentence is needed to handle the situation of for example, a fan starting, and increasing the background level to a value that is interpreted as speech.

In a fifth block 305 a variable average value over 20 PCM frames is calculated $$v\_pstn\_energy=0.95*av\_pstn\_energy+0.05*pstnframeenergy$$

Calculations corresponding to the ones above are also made for PCM frames from the Internet to the PSTN network. In a sixth block 306 the energy calculation for the PCM frame is performed.

```
/* Calculate frame energy*/
for ( loop = 0 ; loop < AUDIOBUFFERLEN ; loop++)
{
  clientframeenergy+=abs (client_buf[loop])>>8;
}
```

In a seventh block 307 the background energy for the user is calculated.

$$clientbackground=(32442.0/32768.0)*clientbackground+(325.0/32768.0)*clientbackgroundsample$$

In an eighth block 308 speech is detected. This is done by calculating the ratio of the background energy level and the energy level of the PCM frame for the user.

$$clientvsbackground=-(((long)\ clientbackground* clientoffsettramp)>>offsetramp)>>offsetrampshft)+10*offset -(long)\ clientframeenergy$$

clientsvbackground is calculated to be positive if the energy of the PCM frame is greater than the background energy. If clientvsbackground is positive the PCM frame is presumed to contain speech. Thus clientvsbackground may be used as a means to determine if the user 104 is speaking or silent.

In a ninth block 309 the above calculated parameters are used to update clientback-groundsample.

```
/* Update clientbackgroundsample */
if (clientvsbackground <=0) /*If not speech, then . . . */
{ /* update clientbackgroundsample since not speech*/
  /*Decrement noisecounter*/
```

```
  noisecounterclient = 0
  /* Update */
  clientbackgroundsample = clientframeenergy;
}
else
{ /* Appears to be speech but may also be increased background
  level */
  noisecounterclient -= maxnoisecounter;
  if (noisecounterclient < 0)
    noisecounterpstn += maxnoisecount_plus 1
  /*
  if (noisecounterclient == 0)
    clientbackgroundsample = clientframeenergy;
}
```

The code in the else sentence is needed here too to handle the situation when, for example, a fan starts so that the background level rises to a level that will be interpreted as speech.

In a tenth block 310 a variable average value of 20 PCM frames from the Internet 313 to the PSTN network 212 is calculated.

$$av\_client\_energy=0.95*av\_client\_energy+0.05*clientframeenergy$$

The calculations in the blocks 306 to 310 are thus performed for each PCM frame transmitted from the user 104 to the subscriber 101 in FIG. 1. The values of these parameters are then used in a control switching block 311 to supervise the content of the PCM frames transmitted from the PSTN subscriber 101 to the Internet user 104 in FIG. 1. If the calculations show that the user 104 is speaking and the subscriber 101 is silent the control switching block 311 fills the PCM frames from the subscriber 101 to the user 104 with zeros. Alternatively the PCM frame may be filled with background noise or not be forwarded at all. In this way an echo caused by the user 101 talking in the connection point 103, will not be returned to the user 104.

If the calculations show that the subscriber 101 is speaking and the user 104 is silent the PCM frames from the subscriber will be forwarded unchanged to the user 104.

If the calculations show that the user 104 is speaking and thus the PCM frames from the subscriber 101 are filled with zeros, but the subscriber 101 is now also speaking, the subscriber 101 can break in. The PCM frames from the subscriber are then transmitted unchanged but any echo will drown in the subscriber's speech. The switching from transmitting modified PCM fames to transmitting unmodified ones or vice versa, is not made immediately when the calculations show that one party has stopped talking and the other one has started, but is delayed for a while. This is done to introduce a certain delay in the system so that switching will not be performed too often, for example, when the speaking party is catching breath. The above described function is implemented by the following C code.

```
If (pathopen) /* if switch is set so that PCM frames pass from PSTN
         to Internet, then . . . */
{   /*check if user may come in */
    ownerlevellow = (av_client_energy>av_pstn_energy&&
         av_client_energy>100);
    if ((pstnvsbackground <=0) \\ ownerlevellow)
    {/* if no speech from subscriber wait a period of time
         (timeoutcounter * 20ms) before switching */
         timeoutcounter = Max ((timeoutcounter-1),0);
```

-continued

```
        if ( clientvsbackground <= 0)
        {/* if no speech from client then. . */
            togglehangover=0;
        }
        if (timeoutcounter == 0)
        {/* wait maxhangover*20ms before switching */
            togglehangover += 1;
            if (togglehangover >= maxhangover)
            {/maxhangover*20ms + timeoutcounter*20ms
            passed then switch */
                pathopen =0;
                tempd = pstnbackgroundsave
                pstnbackgroundsave = pstnbackground
                pstnbackground = tempd
                temp1 = noisecounterpstnsave
                noisecounterpstnsave=noisecounterpstn;
                noisecounterpstn = temp1;
                timeoutcounter = maxtimeout;
                togglehangover = 0;
            }
        }
    }
    else
    {
        timeoutcounter = 15;
        togglehangover = 0;
    }
}
else
{/* if transmitting PCM frames filled with zeros */
    ownerlevellow=(av_pstn_energy>3*av_client_energy &&
        av_pstn_energy>300);
    if (clientvsbackground <=0 \\ ownerlevellow)
    {/* If no speech from user 104 the decrement a counter
        so that a period of time (timeoutcounter *20ms) passes be-
            fore switching */
        timeoutcounter = Max (( timeoutcounter-1),0);
        if (pstnvsbackground <= 0)
        {/* If no speech from subscriber 101 */
            togglehangover = 0;
        }
        if (timeoutcounter == 0)
    {/* A certain time has passed with no speech from user */
        togglehangover += 1
        if (togglehangover >= maxhangover)
        {/* A certain time (maxhangover * 20ms) has passed
            with no speech from subscriber, open path for PCM
            frames from subscriber */
            pathopen = 1;
            tempd =pstnbackgroundsave;
            pstnbackgroundsave = pstnbackground;
            pstnbackground = tempd;
            temp1 = noisecounterpstnsave
            noisecounterpstnsave=noisecounterpstn;
            noisecounterpstn = temp1;
            timeoutcounter = maxtimeout;
                togglehangover = 0;
            }
        }
    }
    else
    {
        timeoutcounter = maxtimeout;
        togglehangover = 0;
    }
}
if (!pathopen)
{/* Fill PCM frame with zeros if path closed */
    for (loop=0; loop < AUDIOBUFFERLEN ; loop++)
    {
        pstn_buf[loop]=0
    }
}
/*END*/
```

In the present embodiment the PCM frame is filled with zeros. It would also be possible to fill the PCM frame with background noise or, simply not forward it.

The invention is, of course, not limited to the embodiments described above and shown in the drawings, but may be modified within the scope of the claims.

What is claimed is:

1. A method for suppressing echo in a telephone connection, a first part of said connection being connected through an analogue network and a second part of the connection being connected through a digital network, characterized by the steps of transmitting all sound from the digital network to the analogue network, determining a first value for the energy level of the signal from the analogue network to the digital network, determining a second value for the energy level of the signal from the digital to the analogue network; transmitting sound from the analogue network to the digital network in dependence of the result of a comparison between said first and second values.

2. A method according to claim 1, wherein sound is transmitted from the analogue network to the digital network if the result of the comparison indicates that the signal from the analogue to the digital network comprises speech.

3. A method according to claim 1, characterized in that if the result of the comparison indicates that sound should not be transmitted from the analogue network to the digital network, the signal from the analogue network to the digital network is replaced with background noise.

4. A method according to claim 1, characterized in that if the result of the comparison indicates that sound should not be transmitted from the analogue network to the digital network, the signal from the analogue network to the digital network is replaced with zeros.

5. An apparatus for suppressing echo in a telephone connection in which a first part of the connection is connected through an analogue network and a second part of the connection is connected through a digital network, characterized in that the apparatus comprises first detection means arranged to determine a first value of the energy level in the signal from the analogue network to the digital network; second detection means arranged to determine a second value of the energy level in the signal from the digital network to the analogue network;

comparing means for comparing the first and the second value and transmit an output signal representing the result of the comparison;

connection means arranged to always transmit the signal from the digital network to the analogue network, and to transmit or not transmit the signal from the analogue network to the digital network in dependence of the output signal from the comparing means.

6. An apparatus according to claim 5, wherein the connection means is arranged to transmit sound from the analogue network to the digital network if the result of the comparison indicates that the signal from the analogue network to the digital network comprises speech.

7. An apparatus according to claim 5, wherein the connection means is arranged to, if the result of the comparison indicates that sound should not be transmitted from the analogue to the digital network, replace the signal from the analogue network to the digital network with background noise.

8. An apparatus according to claim 5, wherein the connection means is arranged to, if the result of the comparison indicates that sound should not be transmitted from the analogue to the digital network replace the signal from the analogue network to the digital network with zeros.

9. A method according to claim 2, characterized in that if the result of the comparison indicates that sound should not be transmitted from the analogue network to the digital network, the signal from the analogue network to the digital network is replaced with background noise.

10. A method according to claim 2, characterized in that if the result of the comparison indicates that sound should not be transmitted from the analogue network to the digital network, the signal from the analogue network to the digital network is replaced with zeros.

11. An apparatus according to claim 6, wherein the connection means is arranged to, if the result of the comparison indicates that sound should not be transmitted from the analogue to the digital network, replace the signal from the analogue network to the digital network with background noise.

12. An apparatus according to claim 6, wherein the connection means is arranged to, if the result of the comparison indicates that sound should not be transmitted from the analogue to the digital network replace the signal from the analogue network to the digital network with zeros.

* * * * *